United States Patent
Taubert et al.

(10) Patent No.: US 9,610,919 B2
(45) Date of Patent: Apr. 4, 2017

(54) RE-CONFIGURABLE PASSENGER BENCH SEAT

(71) Applicant: Airbus Operations GmbH, Hamburg (DE)

(72) Inventors: Sven Taubert, Hamburg (DE); Florian Schmidt, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 0 days.

(21) Appl. No.: 14/827,493

(22) Filed: Aug. 17, 2015

(65) Prior Publication Data

US 2016/0039387 A1 Feb. 11, 2016

Related U.S. Application Data

(63) Continuation of application No. PCT/EP2014/053075, filed on Feb. 18, 2014.

(Continued)

(30) Foreign Application Priority Data

Feb. 19, 2013 (DE) .................... 10 2013 002 887

(51) Int. Cl.
*B60R 22/20* (2006.01)
*B64D 11/06* (2006.01)
(Continued)

(52) U.S. Cl.
CPC .............. *B60R 22/20* (2013.01); *B60N 2/242* (2013.01); *B61D 33/005* (2013.01);
(Continued)

(58) Field of Classification Search
CPC ..... B60R 22/20; B60R 22/201; B60R 22/202; B60R 22/203; B60R 2022/207;
(Continued)

(56) References Cited

U.S. PATENT DOCUMENTS 3,893,729 A 7/1975 Sherman et al.
4,881,702 A * 11/1989 Slettebak ........... B64D 11/0693
244/118.6

(Continued)

FOREIGN PATENT DOCUMENTS

CN 1 695 989 A 11/2005
DE 43 37 941 A1 5/1995
(Continued)

OTHER PUBLICATIONS

Chinese Office Action for Application No. 201480009427.6 dated Mar. 28, 2016.

(Continued)

*Primary Examiner* — Philip Gabler
(74) *Attorney, Agent, or Firm* — Jenkins, Wilson, Taylor & Hunt, P.A.

(57) ABSTRACT

A passenger bench seat comprises a backrest, a seat element, a fastening rail which extends substantially parallel to a longitudinal axis of the seat element in the region of an edge of the seat element that faces towards the backrest, and a seatbelt system. In a first configuration of the passenger bench seat, the seatbelt system includes a first number of seatbelts which are detachably fastened to the fastening rail in first positions which are adapted to the first configuration of the passenger bench seat. In a second configuration of the passenger bench seat, on the other hand, the seatbelt system includes a second number of seatbelts which are detachably fastened to the fastening rail in second positions which are adapted to the second configuration of the passenger bench seat.

13 Claims, 8 Drawing Sheets

Related U.S. Application Data (60) Provisional application No. 61/766,136, filed on Feb. 19, 2013.

(51) Int. Cl.
  *B60N 2/24* (2006.01)
  *B61D 33/00* (2006.01)
  *B60R 22/26* (2006.01)

(52) U.S. Cl.
  CPC .......... *B61D 33/0092* (2013.01); *B64D 11/06* (2013.01); *B64D 11/062* (2014.12); *B64D 11/0612* (2014.12); *B64D 11/0644* (2014.12); *B64D 11/0693* (2013.01); *B60R 2022/207* (2013.01); *B60R 2022/266* (2013.01)

(58) Field of Classification Search
  CPC .......... B60R 2022/266; B64D 11/0612; B64D 11/062; B64D 11/0644; B64D 11/06; B64D 11/0693; B60N 2/242; B61D 33/005; B61D 33/0092
  See application file for complete search history.

(56) References Cited

U.S. PATENT DOCUMENTS

| | | |
|---|---|---|
| 5,553,813 A | 9/1996 | Merensky |
| 5,746,476 A | 5/1998 | Novak et al. |
| 5,775,642 A * | 7/1998 | Beroth ............... B64D 11/0693 244/118.6 |
| 6,666,520 B2 * | 12/2003 | Murphy ................ B60R 22/26 297/216.1 |
| 6,676,219 B1 * | 1/2004 | Brewer ................ B60R 22/023 297/483 |
| 7,182,370 B2 | 2/2007 | Arnold |
| 7,500,722 B2 * | 3/2009 | Morris ................ B60R 22/023 297/232 |
| 7,625,010 B2 | 12/2009 | Fujii et al. |
| 2008/0277915 A1 * | 11/2008 | Fujii ..................... B60R 22/022 280/801.1 |
| 2009/0174250 A1 | 7/2009 | Foye et al. |

FOREIGN PATENT DOCUMENTS

| | | |
|---|---|---|
| DE | 60 2004 002 119 T2 | 3/2007 |
| EP | 0 747 286 A2 | 12/1996 |
| EP | 2 479 072 A1 | 7/2012 |
| EP | 2 738 095 A1 | 6/2014 |
| JP | S 57 118 934 A | 7/1982 |

OTHER PUBLICATIONS

German Search Report for Application No. 10 2013 002 887.6 dated Sep. 30, 2013.
International Search Report and Written Opinion for Application No. PCT/EP2014/053075 dated Jul. 14, 2014.

* cited by examiner

RE-CONFIGURABLE PASSENGER BENCH SEAT

CROSS-REFERENCE TO RELATED APPLICATIONS

This application is a continuation of and claims priority to PCT/EP2014/053075 filed Feb. 18, 2014 which claims the benefit of and priority to U.S. Provisional Application No. 61/766,136, filed Feb. 19, 2013 and German Patent Application No. 10 2013 002 887.6 filed Feb. 19, 2013, the entire disclosures of which are all incorporated by reference herein.

TECHNICAL FIELD

The disclosure herein relates to a passenger bench seat which is suitable for use in the passenger cabin of an aircraft, but also for use in other means of transport, such as buses or trains for example.

BACKGROUND

In modern means of transport, particularly in aircraft, optimum utilization of the space available in a passenger cabin is of major economic importance. The cabin layout, particularly the layout of the passenger seats arranged in the passenger cabin, such as the allocation of a row of passenger seats to business class or to economy class for example, should be as flexibly, rapidly and easily re-configurable as possible. In addition, efforts are made to design the passenger cabin of a commercial aircraft in such a way that flexible adaptation of the cabin layout to the requirements of specific user groups, such as, for example, families with small children, senior citizens, people with restricted mobility, etc., is possible.

SUMMARY

An underlying object of the disclosure herein is to provide a passenger bench seat and method which is suitable for use in a means of transport, such as an aircraft for example, and which is rapidly and easily re-configurable and can therefore be particularly flexibly adapted to the requirements of the operator of the means of transport and also to the requirements of specific groups of users of the means of transport.

This object is achieved, at least in part, by a passenger bench seat having features described herein.

A passenger bench seat according to the disclosure herein comprises a backrest and also a seat element. The seat element has a seating surface which extends substantially perpendicularly to a backrest surface of the backrest. The bench seat may further comprise a carrier pedestal to which the backrest and seat element are fastened and which forms the load-bearing structure of the passenger bench seat. The carrier pedestal may be intended for fastening in a standardized seat rail which may be integrated into the floor of a passenger cabin in which the passenger bench seat is to be arranged.

The passenger bench seat further comprises a fastening rail which extends substantially parallel to a longitudinal axis of the seat element in the region of an edge of the seat element that faces towards the backrest. The fastening rail preferably extends over the entire length of the seat element, along that edge of the seat element which faces towards the backrest. The fastening rail may, for example, be of hollow-cylindrical construction and be fastened to the carrier pedestal that forms the load-bearing structure of the passenger bench seat. The fastening rail may be embodied in the form of a one-piece component. If desired, however, it is also conceivably possible to embody the fastening rail in multi-part form. Parts of the fastening rail which are constructed separately from one another can then be arranged one behind another, viewed in the direction of the longitudinal axis of the seat element, and extend between carrier elements of the carrier pedestal which are positioned at a distance from one another and extend substantially perpendicularly to the longitudinal axis of the seat element and which serve to support the seat element. With the passenger bench seat designed in such a way, the parts of the fastening rail which are constructed separately from one another may each be fastened to mutually adjacent carrier elements of the carrier pedestal.

Finally, the passenger bench seat comprises a seatbelt system which comprises, in a first configuration of the passenger bench seat, a first number of seatbelts which are detachably fastened to the fastening rail in first positions which are adapted to the first configuration of the passenger bench seat. In a second configuration of the passenger bench seat, the seatbelt system comprises a second number of seatbelts which are detachably fastened to the fastening rail in second positions which are adapted to the second configuration of the passenger bench seat. The fastening rail is preferably positioned in such a way that it is not directly visible to passengers using the passenger bench seat, but is easily accessible for fastening the seatbelts belonging to the seatbelt system. For example, the fastening rail may be arranged, in a region of the passenger bench seat in which the seat element and the backrest border on one another, in a gap which is defined by the seat element and the backrest and which is concealed, when the passenger bench seat is viewed from in front, by cushions belonging to the seat element and the backrest. In this region, the seat element and backrest preferably comprise or consist of a soft cushion material which permits easy access to the fastening rail.

The seatbelt system may comprise only one seatbelt, i.e. the first and second number of seatbelts may each amount to 1. With the seatbelt system designed in such a way, the seatbelt is then detachably fastened to the fastening rail at a different position in the first configuration of the passenger bench seat than in the second configuration of the passenger bench seat. Furthermore, it is conceivably possible for the seatbelt system to comprise several seatbelts, in which case the first number of seatbelts corresponds to the second number of seatbelts. Once again, the seatbelts are then detachably fastened to the fastening rail in a different position in the first configuration of the passenger bench seat than in the second configuration of the passenger bench seat. With the seatbelt system designed in such a way, the first configuration of the passenger bench seat therefore differs from the second configuration of the passenger bench seat in terms of the positioning of the seatbelts and thereby the positioning, on the passenger bench seat, of those sections of the passenger bench seat which are intended for use by individual passengers. For example, it is thereby possible to assign more or less space on the passenger bench seat to a passenger, or to vary the position, on the passenger bench seat, of a section of the passenger bench seat which is assigned to a passenger.

Finally, a design of the seatbelt system is conceivably possible in which the first number of seatbelts differs from the second number of seatbelts, i.e. the seatbelt system comprises a different number of seatbelts in the first configuration of the passenger bench seat than in the second configuration of the passenger bench seat. The additional seatbelts which are present in one configuration of the passenger bench seat may then be detachably fastened to the fastening rail at additional positions, while the fastening positions, on the fastening rail, of the seatbelts that are also present in the other configuration of the passenger bench seat are retained. As an alternative to this, however, it is also conceivably possible to also vary the positions of the seatbelts which are present in both configurations of the passenger bench seat, at least in some cases, in a manner dependent upon the configuration. With the seatbelt system designed in such a way, the first configuration of the passenger bench seat therefore differs from the second configuration of the passenger bench seat in terms of the number of seatbelts available and—optionally—also, if applicable, in terms of the positioning of the seatbelts and therefore the positioning, on the passenger bench seat, of those sections of the passenger bench seat which are intended for use by individual passengers. The passenger bench seat can then be used by a different number of passengers in a manner dependent upon the configuration, in which case it is possible, at the same time, to assign more or less space on the passenger bench seat to a passenger or to vary the position, on the passenger bench seat, of a section of the passenger bench seat which has been assigned to a passenger.

As a result of the flexibly re-designable seatbelt system, the passenger bench seat can therefore be used either in its first configuration or in its second configuration, as required, the flexible safety belt system guaranteeing compliance with the necessary safety standards in every configuration of the passenger bench seat. As a result of the detachable fastening of the seatbelt/seatbelts belonging to the seatbelt system to the fastening rail of the passenger bench seat, the passenger bench seat is particularly rapidly and easily re-configurable, so that it can be converted by the cabin crew in a manner specific to requirements, for example during a turn-around, i.e. during the period within which a commercial aircraft is on the ground between two flights. The passenger bench seat permits flexible changing of the cabin layout in the direction of the longitudinal axis of the cabin (the x direction), since the passenger bench seat can be allocated either to business class or to economy class by suitable re-configuration. In addition to this, variation of the cabin layout in a direction perpendicular to the longitudinal axis of the cabin and parallel to the longitudinal axis of the seat element of the passenger bench seat (the y direction) is made possible by the variable occupation of the passenger bench seat. The passenger bench seat can therefore also be particularly flexibly adapted to the requirements of specific user groups. The passenger bench seat thus permits particularly efficient use of the space available in a passenger cabin, particularly a passenger cabin of a commercial aircraft. Adaptation of the cabin crew planning to full utilization of the passenger cabin in a manner dependent upon the configuration of the passenger bench seat makes it possible to achieve additional increases in efficiency.

In one preferred embodiment of the passenger bench seat, the seatbelt system comprises, in a third configuration of the passenger bench seat, a third number of seatbelts which are detachably fastened to the fastening rail in third positions which are adapted to the third configuration of the passenger bench seat. In the third configuration of the passenger bench seat, the third number of seatbelts may correspond to the first and/or second number of seatbelts belonging to the seatbelt system in the first or second configuration of the passenger bench seat respectively. In the third configuration of the passenger bench seat, however, the seatbelts belonging to the seatbelt system are then detachably fastened to the fastening rail in a different position than in the first or second configuration of the passenger bench seat. In the third configuration of the passenger bench seat, however, the seatbelt system preferably comprises a number of seatbelts that differs from the first and/or second number of seatbelts which the seatbelt system comprises in the first or second configuration of the passenger bench seat. Once again, additional seatbelts which are present in the third configuration of the passenger bench seat can be detachably fastened to the fastening rail at additional positions, while seatbelts which are also present in the other configurations of the passenger bench seat remain in their positions. As an alternative to this, however, any desired repositioning of any desired number of that number of seatbelts belonging to the seatbelt system which is present in the third configuration of the passenger bench seat, relative to the first and/or second configuration of the passenger bench seat, is conceivably possible.

In one preferred embodiment of the passenger bench seat, the passenger bench seat is intended to be occupied by two passengers in its first configuration. The seatbelt system then comprises two seatbelts which are detachably fastened to the fastening rail in first positions. In its second configuration, on the other hand, the passenger bench seat may be intended to be occupied by three passengers. The seatbelt system then comprises three seatbelts which are detachably fastened to the fastening rail at corresponding second positions in each case. Finally, in its third configuration, the passenger bench seat may be intended to offer space to four passengers. The seatbelt system then comprises four seatbelts which are detachably fastened to the fastening rail at corresponding fourth positions.

In its first configuration, the passenger bench seat then offers an increased amount of space to two passengers. In its first configuration, therefore, the passenger bench seat is suitable, for example, for use in the business class of a commercial aircraft or for occupation by passengers who require increased space such as, for example, overweight passengers or passengers with restricted mobility. In its second configuration, on the other hand, the passenger bench seat may be expediently used in the economy class of a commercial aircraft and offers sufficient space for three passengers who do not require increased space. Finally, in its third configuration, the passenger bench seat is particularly well suited to use by families with small children since, in its third configuration, the passenger bench seat offers sufficient space for two adults and also for two small children sitting, for example, between the two adults.

In one preferred embodiment of the passenger bench seat, the seat element has a continuous seating surface. Here, a "continuous seating surface" is understood to mean a seating surface in which individual sections of the seating surface are not separated from one another by gaps, projections or the like. As a result, the comfort of passengers sitting on the passenger bench seat is not impaired by re-configuration of the latter.

Alternatively or in addition to this, the backrest of the passenger bench seat may be provided with a continuous backrest surface. Here again, a "continuous backrest surface" is understood to mean a backrest surface in which individual sections of the backrest are not separated from one another by gaps, projections or the like. A continuous backrest surface likewise ensures that the comfort of passengers sitting on the passenger bench seat is not impaired by re-configuration of the latter. The passenger bench seat preferably has a rigid backrest, i.e. a backrest which cannot be tilted, relative to the seat element, between an upright position and a reclined position.

A plurality of first seatbelt-retaining elements, which are arranged in a manner distributed along the fastening rail, may be provided on the fastening rail. Each first seatbelt-retaining element may be detachably connectable to a second seatbelt-retaining element which is provided on a seatbelt of the seatbelt system. Basically, the first seatbelt-retaining elements must be rigidly connected to the fastening rail or constructed in a manner integrated with the fastening rail. With the passenger bench seat designed in such a way, it is then necessary to provide a corresponding number of first seatbelt-retaining elements which makes it possible to fasten the seatbelts belonging to the seatbelt system to the fastening rail at suitable positions in dependence upon the configuration of the passenger bench seat. Re-configuration of the passenger bench seat then requires no repositioning of the first seatbelt-retaining elements and can therefore be achieved particularly rapidly and easily. In at least one configuration of the passenger bench seat, however, at least one unused first seatbelt-retaining element is then present, which increases the weight of the passenger bench seat.

As an alternative to this, therefore, it is conceivably possible to equip the passenger bench seat with at least one first seatbelt-retaining element which is displaceable along the fastening rail and lockable in various positions along the latter. For the purpose of re-configuring the passenger bench seat, it is then necessary to displace the first seatbelt-retaining element along the fastening rail, if applicable, and to lock it in the desired position. However, the passenger bench seat is then distinguished by particularly low weight since it is not necessary to provide any first seatbelt-retaining elements which are unused in at least one configuration of the passenger bench seat. If desired, all the first seatbelt-retaining elements belonging to the passenger bench seat may be embodied so as to be displaceable along the fastening rail and lockable in various positions along the latter. Furthermore, it is conceivably possible to connect some of the first seatbelt-retaining elements, which are provided, for example, in the region of the ends of the fastening rail, rigidly to the fastening rail, or to construct them in a manner integrated with the latter, but additionally to also provide first seatbelt-retaining elements which are displaceable along the fastening rail and lockable in various positions along the latter.

At least one first seatbelt-retaining element may comprise a fastening section which extends round a periphery of the fastening rail. The fastening section may be, for example, of substantially ring-shaped construction. The fastening section is preferably dimensioned in such a way that it is displaceable along the fastening rail, relative to the latter. Locking of the fastening section in a desired position along the fastening rail may be achieved, for example, by a suitable fastening device, such as, for example, a screw or the like, which is supported on a peripheral surface of the fastening rail or comes into engagement with a thread provided in the latter. Furthermore, it is conceivably possible to construct the fastening section in the form of a tubular clip or the like, which can be fixed in its position along the fastening rail by a clamping screw or the like.

At least one first seatbelt-retaining element may also comprise a connecting section, which extends from the fastening section, for connecting the first seatbelt-retaining element to a second seatbelt-retaining element. The connecting section may extend from the fastening section in the radial direction for example. If desired, all the first seatbelt-retaining elements may comprise a fastening section which extends round a periphery of the fastening rail and/or a connecting section which extends from the fastening section.

The connecting section preferably comprises a first connecting plate and also a second connecting plate which extends substantially parallel to the first connecting plate. The connecting section may also comprise a connecting shaft which extends, substantially perpendicularly to the first and second connecting plates, between the first and the second connecting plate.

At least one second seatbelt-retaining element may comprise a connecting snap-hook with a snap-hook nose which is resiliently pretensioned into a closed position of the connecting snap-hook. The connecting snap-hook can be brought into engagement, in a simple and secure manner, with the connecting shaft of the connecting section of a first seatbelt-retaining element, in order to connect the second seatbelt-retaining element to the first seatbelt-retaining element. Furthermore, at least one second seatbelt-retaining element may comprise a baseplate and also an eye, which is formed in the baseplate, for connecting the second seatbelt-retaining element to a belt element of the seatbelt. If desired, all the second seatbelt-retaining elements may be constructed with a connecting snap-hook of this kind, a baseplate of this kind and/or an eye for connecting the second seatbelt-retaining element to a belt element of the seatbelt.

The passenger bench seat may further comprise an armrest system which comprises, in a first configuration of the passenger bench seat, a first number of armrests which are arranged in first positions which are adapted to the first configuration of the passenger bench seat. In a second configuration of the passenger bench seat, the armrest system may comprise a second number of armrests which are arranged in second positions which are adapted to the second configuration of the passenger bench seat. The first number of armrests may be equal to the second number of armrests. With the passenger bench seat designed in such a way, however, the armrests belonging to the armrest system are arranged in a different position in the first configuration of the passenger bench seat than in the second configuration of the passenger bench seat. However, the first number of armrests preferably differs from the second number of armrests, i.e. the passenger bench seat comprises a different number of armrests in its first configuration than in its second configuration.

In a third configuration of the passenger bench seat, the armrest system preferably comprises a third number of armrests, which are arranged in third positions which are adapted to the third configuration of the passenger bench seat. The third number of armrests may correspond to the first and/or second number of armrests, so that the armrests belonging to the armrest system in the third configuration of the passenger bench seat are merely arranged at different positions than in the first or second configuration of the passenger bench seat. However, the third number of armrests preferably differs from the first and/or second number of armrests which the armrest system comprises in the first or second configuration of the passenger bench seat.

For example, in the first configuration of the passenger bench seat in which the latter is intended for occupation by two passengers, the armrest system of the passenger bench seat may comprise three armrests: two outer armrests which are rigidly connected to the carrier pedestal of the passenger bench seat and also a central armrest which is arranged between the two sections of the passenger bench seat which are intended for occupation by one passenger each. In the second configuration of the passenger bench seat in which the latter is intended for occupation by three passengers, on the other hand, the armrest system may comprise four armrests: once again two outer armrests which are rigidly connected to the carrier pedestal of the passenger bench seat and also two central armrests which are each arranged between the sections of the passenger bench seat which are intended for occupation by one passenger each. If desired, the central armrest which is used in the first configuration of the passenger bench seat may be wider than the two central armrests which are used in the second configuration of the passenger bench seat. In the third configuration of the passenger bench seat in which the latter is intended for occupation by four persons, on the other hand, the armrest system may comprise only two armrests: the two outer armrests which are rigidly connected to the carrier pedestal of the passenger bench seat. As a result, a maximum amount of space is made available to the passengers sitting on the passenger bench seat.

The armrest system preferably comprises at least one recess, which is constructed in the backrest of the passenger bench seat, for receiving an armrest. The recess is used for receiving an armrest in a configuration of the passenger bench seat in which the armrest is not used. The recess is preferably dimensioned in such a way that it is capable of receiving the armrest so completely that a surface of the armrest which faces towards the seating surface of the seat element when the armrest is in a usable condition, is aligned flush with the backrest surface of the backrest when the armrest is in a condition in which it is received in the recess. When the armrest is received in the recess, the seating comfort of a passenger sitting on the passenger bench seat is consequently not restricted.

The armrest system is preferably provided with a number of recesses constructed in the backrest of the passenger bench seat that corresponds to the number of the armrests which are adjustable between a usable condition and a folded-up condition. For example, the armrest system may comprise a first recess, which is constructed in the backrest of the passenger bench seat, for receiving a central armrest which is suitable for use in the first configuration of the passenger bench seat, in which the latter is intended for occupation by two passengers. In addition to this, the armrest system preferably comprises two second recesses which are constructed in the backrest of the passenger bench seat and serve to receive two central armrests which can be used in the second configuration of the passenger bench seat, in which the latter is to be occupied by three passengers.

The backrest of the passenger bench seat may be provided with a stiffening structure in the region of an edge that faces away from the seat element. The stiffening structure may be integrated into the backrest in a manner which is not visible from outside. As an alternative to this, however, it is also conceivably possible to equip the backrest with a visible stiffening structure. For example, the backrest may comprise, in the region of its upper edge that faces away from the seat element, a sitiffened plastic structure which may, if desired, be provided with a handle element. The backrest may then by used by a passenger for the purpose of supporting himself when sitting down on the passenger bench seat or when getting up from the latter.

An above-described passenger bench seat is particularly well suited to use in an aircraft.

BRIEF DESCRIPTION OF THE DRAWINGS

One preferred form of embodiment of the disclosure herein will now be explained in greater detail with the aid of the appended diagrammatic drawings, in which.

DETAILED DESCRIPTION

FIGS. 1 through 6 show a passenger bench seat 10 which is suitable for use in a passenger cabin belonging to a means of transport, in particular a commercial aircraft. The passenger bench seat 10 comprises a backrest 12 and also a seat element 14. A seating surface 16 of the seat element 14 extends substantially perpendicularly to a backrest surface 18 of the backrest 12. The seating surface 16 of the seat element 14 is constructed in the form of a continuous seating surface 16, i.e. the seating surface 16 has no gaps, projections or the like. Similarly, the backrest surface 18 is constructed in the form of a continuous backrest surface 18, i.e. the backrest surface 18 also has no gaps, projections or the like. The passenger bench seat 10 is equipped with a rigid backrest, i.e. a backrest which cannot be tilted, relative to the seat element 14, between an upright position and a reclined position.

The passenger bench seat 10 further comprises a carrier pedestal 20 to which the backrest 12 and the seat element 14 are fastened and which forms the load-bearing structure of the passenger bench seat 10. As can be seen in FIGS. 1 to 6, the carrier pedestal 20 comprises three supporting elements 22 which are each intended to be fixed in a standardized seat rail integrated into a floor of the passenger cabin. The carrier pedestal 20 further comprises four carrier elements 24 which are arranged one behind another at a distance from one another, viewed in the direction of a longitudinal axis L of the seat element 14, and which serve, among other things, to support the seat element 14; see FIG. 7. The carrier elements 24 are connected to one another by two supporting struts 26 which extend substantially parallel to the longitudinal axis L of the seat element 14 and also parallel to one another. The carrier elements 24 are each L-shaped, i.e. each carrier element 24 has a section 28 which extends substantially perpendicularly to the seating surface 16 of the seat element 14 in the direction of the backrest 12 and serves to support the backrest 12.

Figure 7:
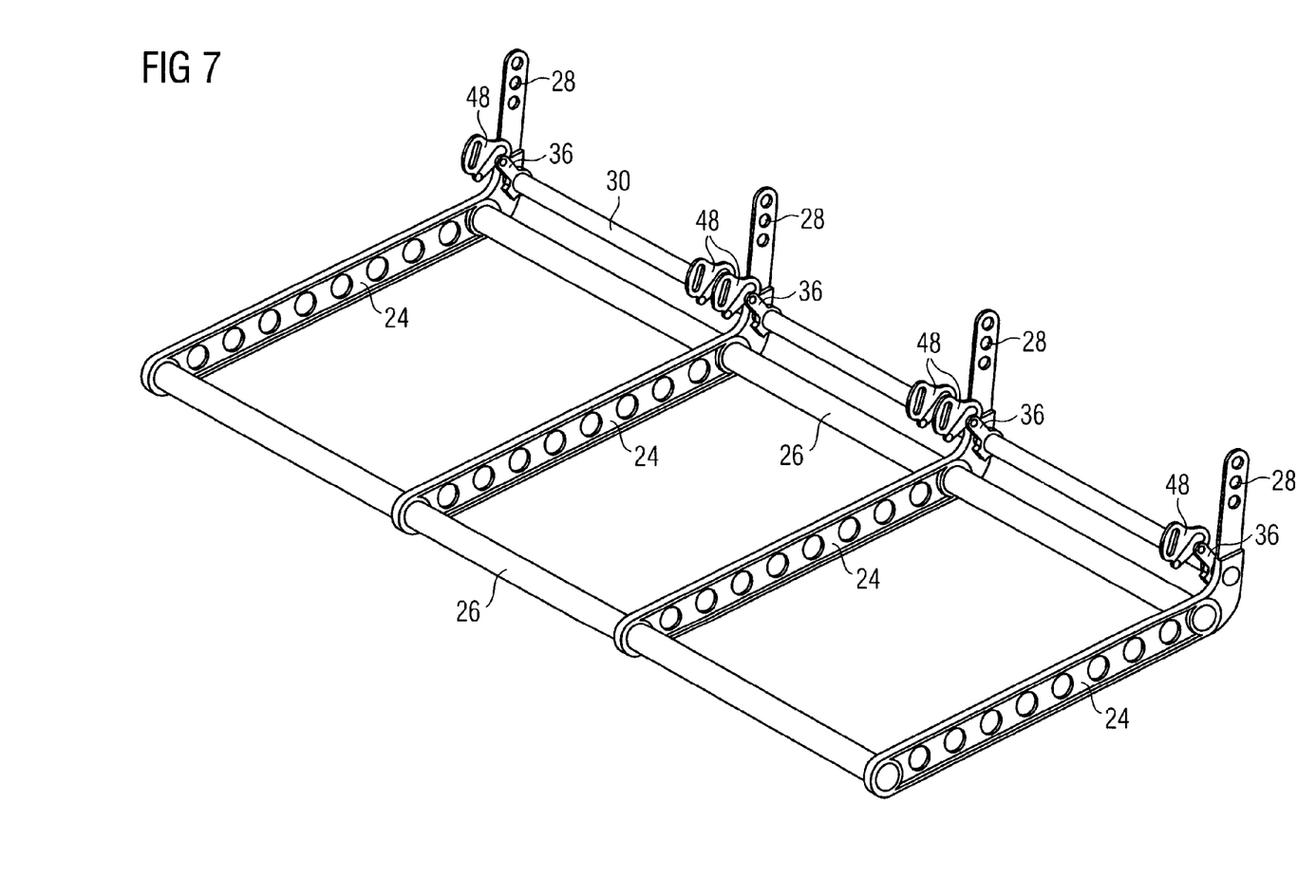
FIG. 7 shows part of a carrier pedestal and also a fastening rail belonging to the passenger bench seat according to FIGS. 1 to 6.
Figure 8:
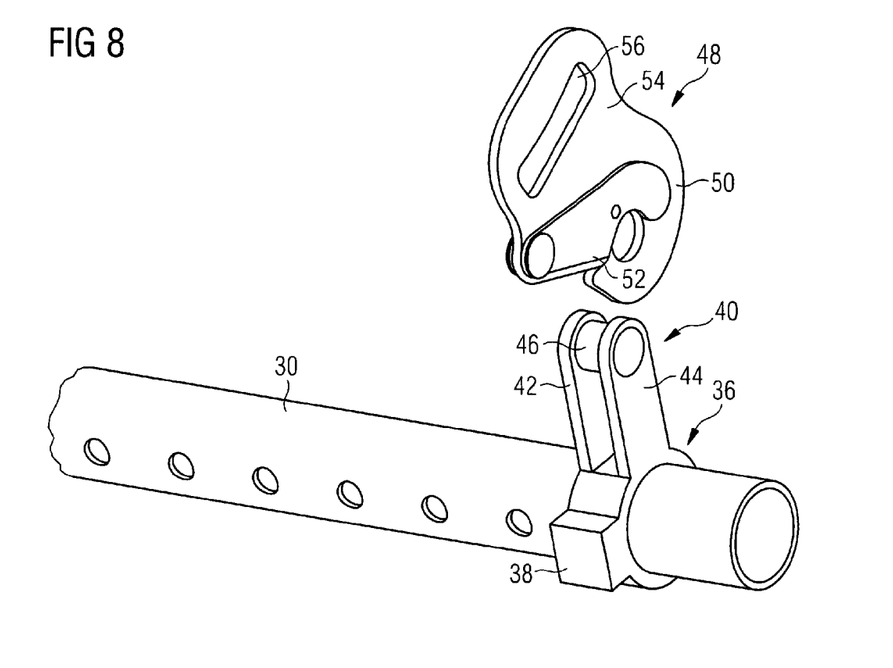
FIG. 8 shows a detail view of the fastening rail according to FIG. 7, a first seatbelt-retaining element which is fastened to the fastening rail, and also a second seatbelt-retaining element.
Figure 9:
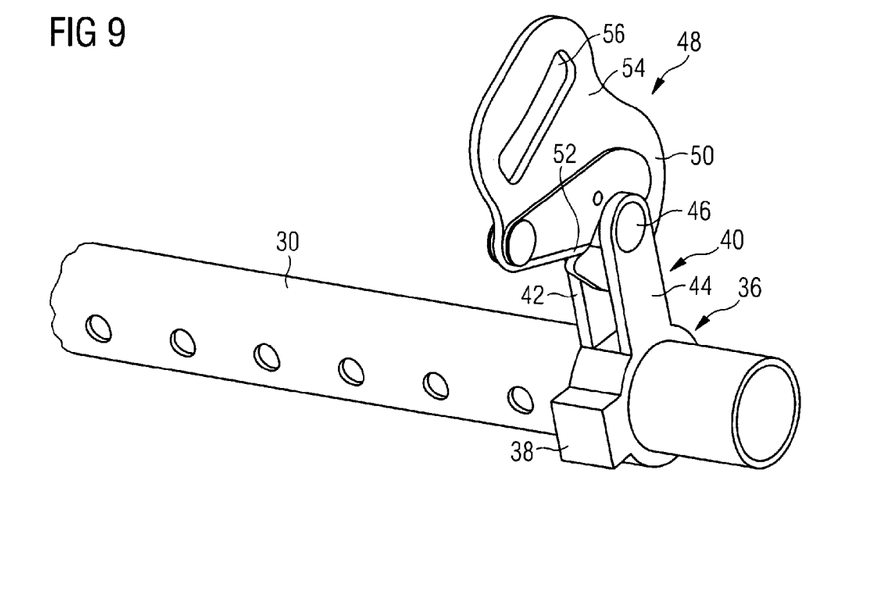
FIG. 9 shows the detail view of the fastening rail, the first seatbelt-retaining element and the second seatbelt-retaining element according to FIG. 8, in which detail view the first and second seatbelt-retaining elements are in engagement with one another.

The passenger bench seat 10 further comprises a fastening rail 30; see FIGS. 7 to 9. The fastening rail 30 extends substantially parallel to the longitudinal axis L of the seat element 14 in the region of an edge of the seat element 14 that faces towards the backrest 12. In the exemplary embodiment of a passenger bench seat 10 which is shown in the figures, the fastening rail 30 is of one-piece and hollow-cylindrical construction and is fastened to the sections 28 of the carrier elements 24 of the carrier pedestal 20, the fastening rail 30 passing through the sections 28 of the two central carrier elements 24. As an alternative to this, a multipart embodiment of the fastening rail 30 would also be conceivably possible, in which the parts, which are constructed separately from one another, could each extend between two mutually adjacent carrier elements 24.

Figure 1:
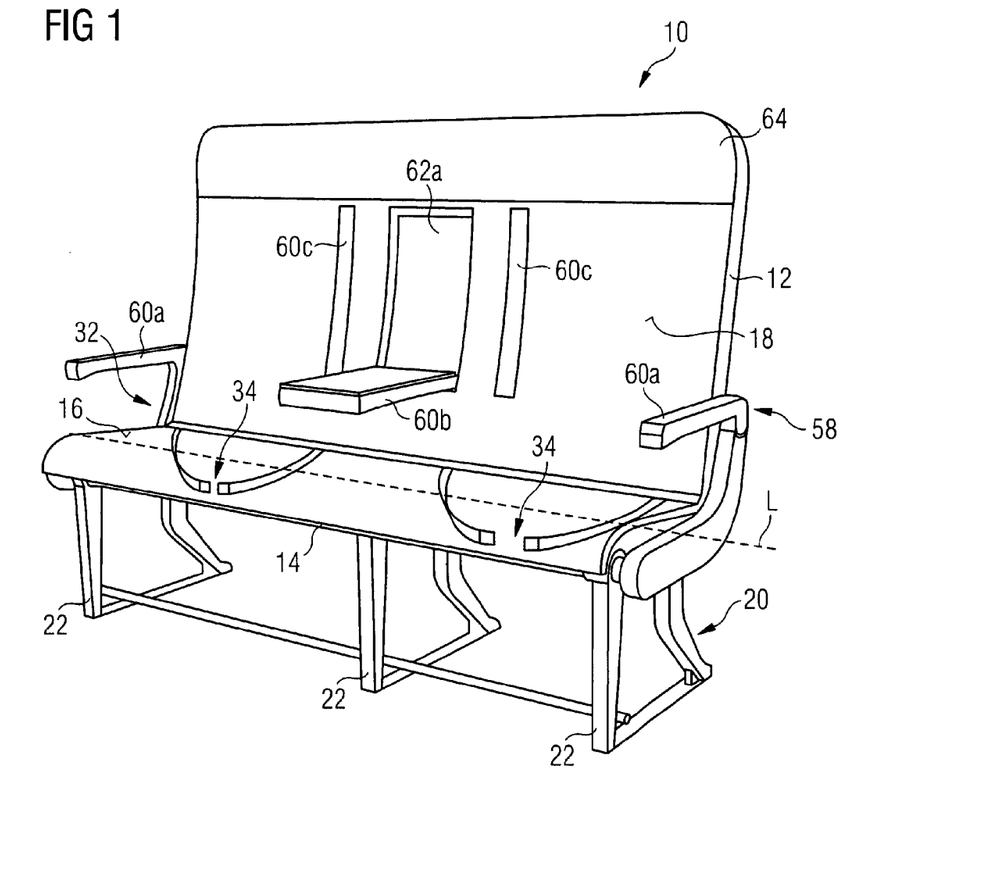
FIG. 1 shows a passenger bench seat which is suitable for use in a means of transport, particularly an aircraft, in a first configuration.
Figure 2:
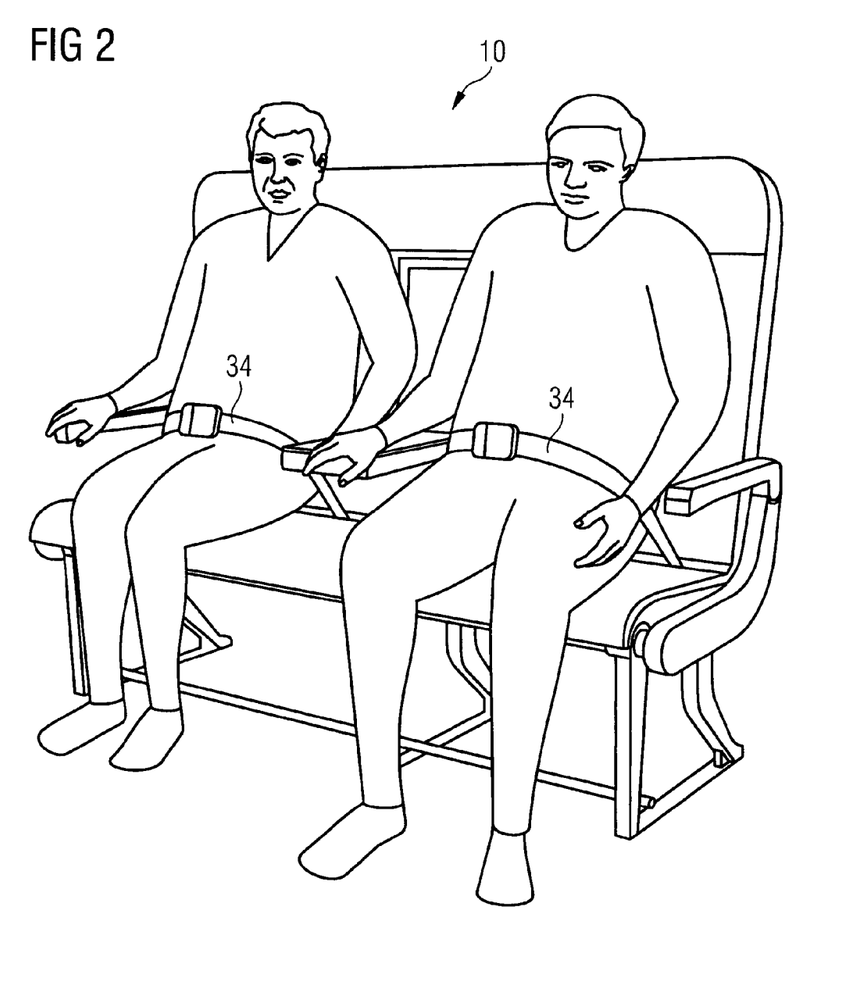
FIG. 2 shows the passenger bench seat according to FIG. 1, occupied by two passengers.

Finally, the passenger bench seat 10 comprises a seatbelt system 32. In a first configuration of the passenger bench seat 10, which is illustrated in FIGS. 1 and 2, the seatbelt system 32 comprises a first number of seatbelts 34, namely two seatbelts 34, which are detachably fastened to the fastening rail 30 in first positions which are adapted to the first configuration of the passenger bench seat 10. As can be seen in FIG. 2, the passenger bench seat 10 is intended, in its first configuration, for occupation by two passengers, half the passenger bench seat being available to each passenger. For example, the passenger bench seat 10 may be used, in its first configuration, in business class or for occupation by passengers who require increased space.

A method of providing and using a passenger bench seat such as passenger bench seat 10 is provided as passenger bench seat 10 can be used in an aircraft.

Figure 3:
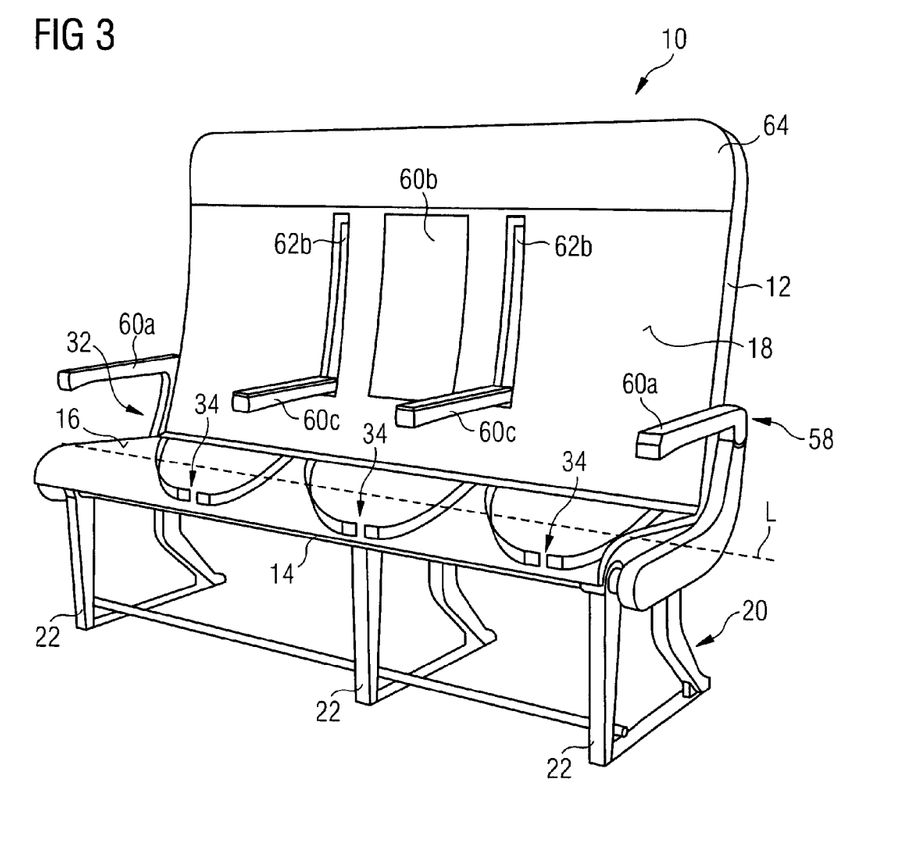
FIG. 3 shows the passenger bench seat according to FIG. 1, in a second configuration.
Figure 4:
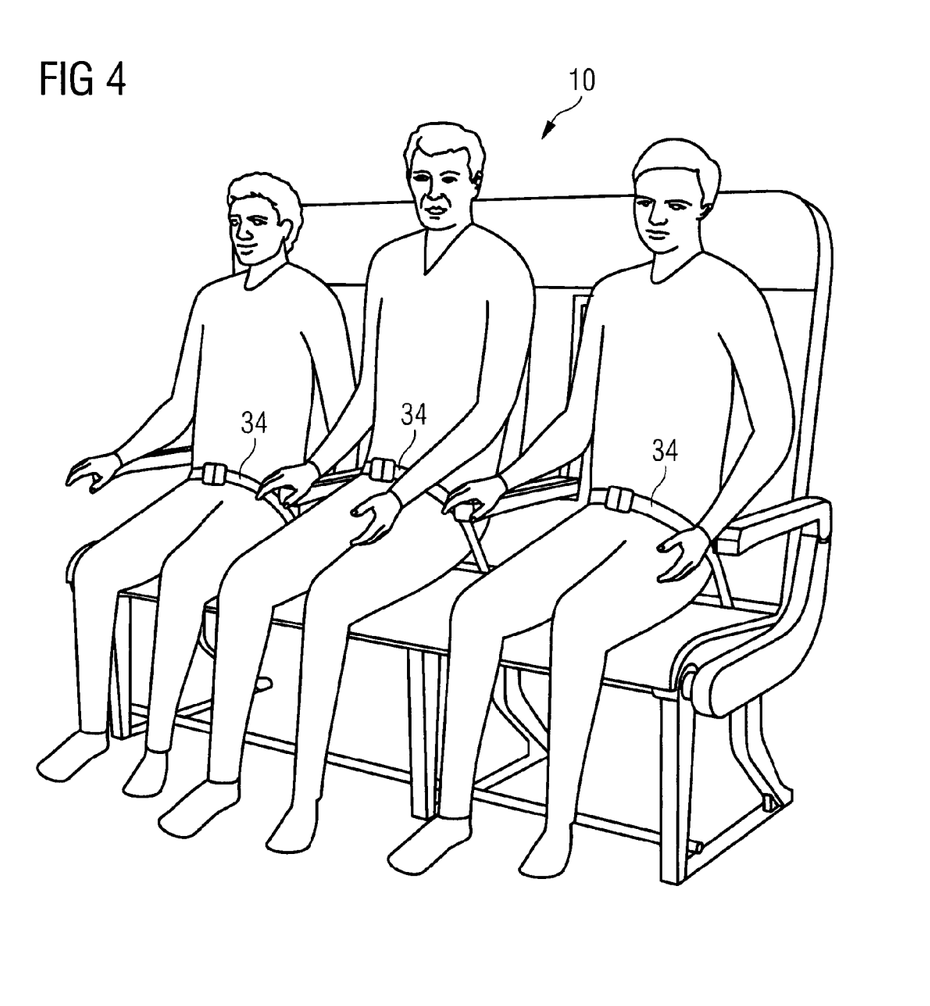
FIG. 4 shows the passenger bench seat according to FIG. 3, occupied by three passengers.

FIGS. 3 and 4 illustrate a second configuration of the passenger bench seat 10. In the second configuration of the passenger bench seat 10, the seatbelt system 32 comprises a second number of seatbelts 34, namely three seatbelts 34, which are detachably fastened to the fastening rail 30 in second positions which are adapted to the second configuration of the passenger bench seat 10. As is apparent, in particular, from FIG. 4, the passenger bench seat 10 is intended, in its second configuration, for occupation by three passengers. In its second configuration, the passenger bench seat 10 may be used as a conventional economy class passenger bench seat which is occupied by three passengers.

Figure 5:
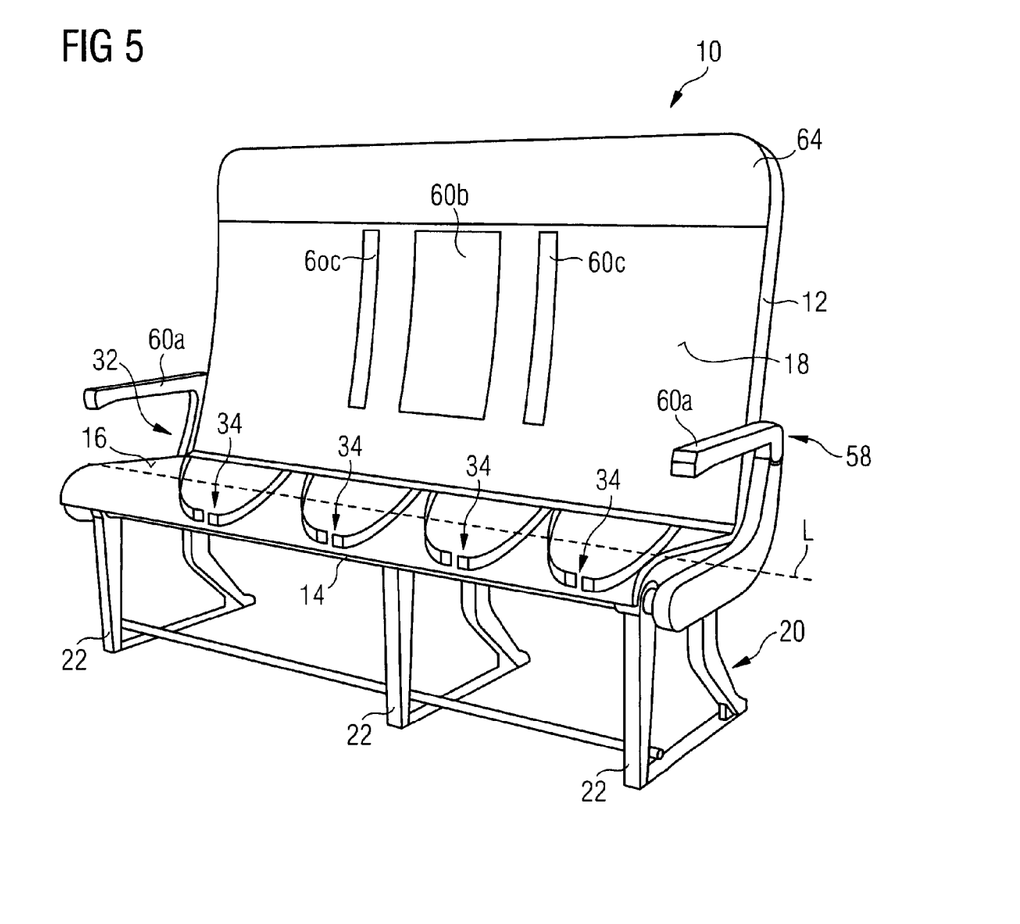
FIG. 5 shows the passenger bench seat according to FIG. 1, in a third configuration.
Figure 6:
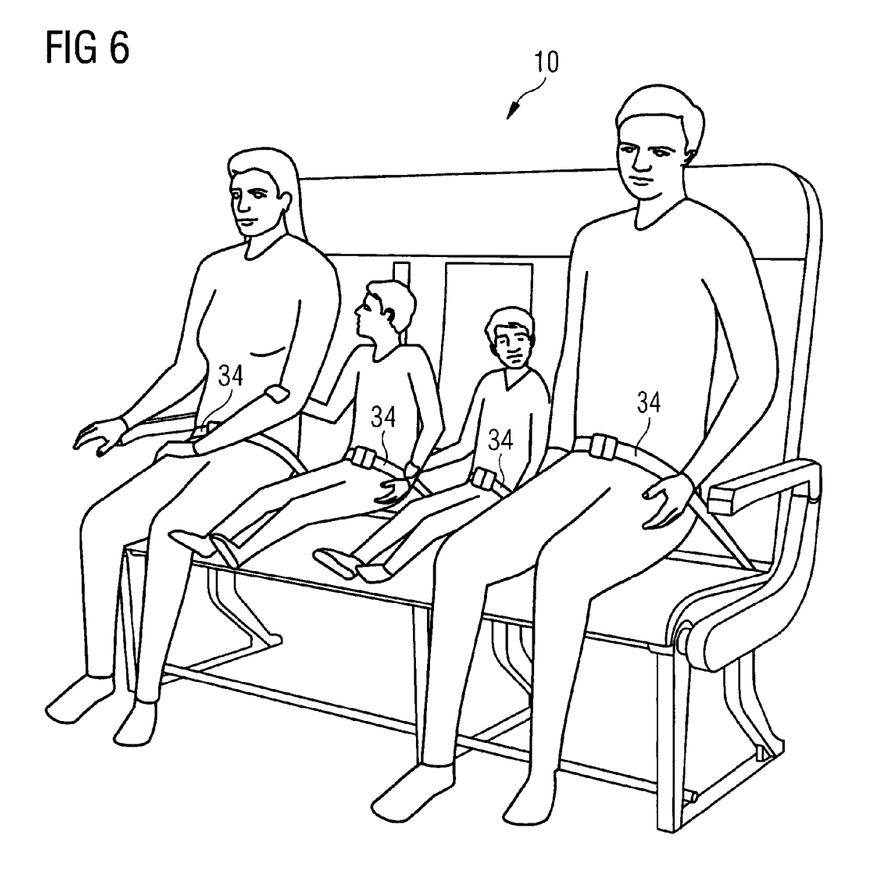
FIG. 6 shows the passenger bench seat according to FIG. 5, occupied by four passengers.

Finally, FIGS. 5 and 6 show the passenger bench seat 10 in a third configuration. In the third configuration of the passenger bench seat 10, the seatbelt system 32 comprises a third number of seatbelts 34, namely four seatbelts 34, which are detachably fastened to the fastening rail 30 in third positions which are adapted to the third configuration of the passenger bench seat 10. As is illustrated in FIG. 6, in its third configuration, the passenger bench seat 10 is intended for occupation by four persons. In its third configuration, the passenger bench seat 10 may, for example, advantageously be used by a family with two adults and two small children, the two small children being seated between the two adults.

In order to permit detachable fastening of the seatbelts 34 belonging to the seatbelt system 32 at various positions on the fastening rail 30, first seatbelt-retaining elements 36 are attached to the fastening rail 30; see FIGS. 7 to 9. Each first seatbelt-retaining element 36 comprises a fastening section 38 which extends round a periphery of the fastening rail 30. The fastening section 38 is of substantially ring-shaped construction and is dimensioned in such a way that it is displaceable along the fastening rail 30. Furthermore, the fastening section 38 can be locked, by a fastening arrangement which is not illustrated, for example a screw, at various positions along the fastening rail 30. In other words, the fastening section 38 and therefore the first seatbelt-retaining element 36 is displaceable along the fastening rail 30 and lockable in a desired position along the latter.

Furthermore, each seatbelt-retaining element 36 is provided with a connecting section 40 which extends from the fastening section 38 in the radial direction. The connecting section 40 comprises a first connecting plate 42 and also a second connecting plate 44 which extends substantially parallel to the first connecting plate 42; see particularly FIG. 8. A connecting shaft 46 extends, substantially perpendicularly to the first and second connecting plates 42, 44, between the first and the second connecting plate 42, 44.

Each first seatbelt-retaining element 36 is intended to interact with a second seatbelt-retaining element 48. Each second seatbelt-retaining element 48 comprises a connecting snap-hook 50 with a snap-hook nose 52 which is resiliently pretensioned into a closed position of the connecting snap-hook 50. The connecting snap-hook 50 can be brought into engagement, in a simple and secure manner, with the connecting shaft 46 of the connecting section 40 of a first seatbelt-retaining element 36, in order to connect the second seatbelt-retaining element 48 securely to the first seatbelt-retaining element 36; see FIGS. 8 and 9. Furthermore, each second seatbelt-retaining element 48 has a baseplate 54. Constructed in the baseplate 54 is an eye 56 which serves to connect the second seatbelt-retaining element 48 to a belt element of a seatbelt 34.

The passenger bench seat 10 further comprises an armrest system 58. In the first configuration of the passenger bench seat 10, which is represented in FIGS. 1 and 2, the armrest system 58 comprises a first number of armrests 60a, 60b, namely three armrests 60a, 60b which are arranged in first positions which are adapted to the first configuration of the passenger bench seat 10. In particular, in the first configuration of the passenger bench seat, the armrest system 58 comprises two outer armrests 60a which are rigidly connected to the carrier pedestal 20, and also a central armrest 60b which is arranged between the two sections of the passenger bench seat 10 which are intended for occupation by one passenger each.

In the second configuration of the passenger bench seat 10 according to FIGS. 3 and 4, on the other hand, the armrest system 58 comprises a second number of armrests 60a, 60c, namely four armrests 60a, 60c. In particular, in the second configuration of the passenger bench seat 10, the armrest system 58 comprises the two outer armrests 60a which are rigidly connected to the carrier pedestal 20, and also two central armrests 60c which are each arranged between the sections of the passenger bench seat 10 which are intended for occupation by one passenger each. The central armrests 60c which are used in the second configuration of the passenger bench seat 10 have a smaller width than the central armrest 60b which is used in the first configuration of the passenger bench seat 10, in which the latter is occupied by only two passengers.

In the third configuration of the passenger bench seat 10, on the other hand, the armrest system 58 comprises a third number of armrests 60a, namely two armrests 60a. In particular, in the third configuration of the passenger bench seat 10, in which the passenger bench seat is intended for occupation by four persons, the armrest system 58 has only the two outer armrests 60a which are rigidly connected to the carrier pedestal 20.

Finally, the armrest system 58 comprises three recesses 62a, 62b which are constructed in the backrest 12 of the passenger bench seat 10. In the second and third configurations of the passenger bench seat 10, the recess 62a serves to receive the central armrest 60b which is used only in the first configuration of the passenger bench seat 10. In the first and fourth configurations of the passenger bench seat 10, on the other hand, the two recesses 62*b* serve to receive the two central armrests 60*c* which are used only in the second configuration of the passenger bench seat 10 when the latter is occupied by three passengers. Each of the recesses 62*a*, 62*b* is dimensioned in such a way that it is capable of receiving the corresponding armrest 60*b*, 60*c* so completely that a surface of the armrest 60*b*, 60*c* which faces towards the seating surface 16 of the seat element 14 when the armrest 60*b*, 60*c* is in a usable condition, is aligned flush with the backrest surface 18 of the backrest 12 when the armrest 60*b*, 60*c* is in a condition in which it is received in the recess 62*a*, 62*b*.

Finally, the backrest 12 of the passenger bench seat 10 may be provided with a stiffened structure 64 in the region of an edge that faces away from the seat element 14. The backrest 12 or the stiffening structure 64 may then be used by a passenger for the purpose of supporting himself when sitting down on the passenger bench seat 10 or when getting up from the latter.

For the purpose of re-configuring the passenger bench seat 10, it is merely necessary to adapt the number and positions of the seatbelts 34 belonging to the seatbelt system 32 to the desired new configuration of the passenger bench seat 10. For this purpose, the second seatbelt-retaining elements 48 of seatbelts 34 which are no longer needed in the desired new configuration of the passenger bench seat 10 are detached from the corresponding first seatbelt-retaining elements 36. Furthermore, the first seatbelt-retaining elements 36 which are still connected to the second seatbelt-retaining elements 48 which are needed, even in the desired new configuration of the passenger bench seat 10, are displaced to the desired position along the fastening rail 30 and locked at that point. As an alternative to this, the second seatbelt-retaining elements 48 of seatbelts 34 which are additionally needed in the desired new configuration of the passenger bench seat 10 may be connected to first seatbelt-retaining elements 36 which have been suitably positioned beforehand.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A passenger bench seat, comprising:
   a backrest;
   a seat element;
   a fastening rail which extends substantially parallel to a longitudinal axis of the seat element in a region of an edge of the seat element that faces towards the backrest; and
   a seatbelt system which comprises, in a first configuration of the passenger bench seat, a first number of seatbelts which are detachably fastened to the fastening rail in first positions which are adapted to the first configuration of the passenger bench seat, and which seatbelt system comprises, in a second configuration of the passenger bench seat, a second number of seatbelts which are detachably fastened to the fastening rail in second positions which are adapted to the second configuration of the passenger bench seat; and
   on the fastening rail, a plurality of first seatbelt-retaining elements arranged in a manner distributed along the fastening rail in a direction of the longitudinal axis of the seat element, each first seatbelt-retaining element being detachably connectable to a second seatbelt-retaining element provided on a seatbelt of the seatbelt system, and
   wherein at least one first seatbelt-retaining element is displaceable along the fastening rail and lockable in various positions along the fastening rail in a direction of the longitudinal axis of the seat element.

2. The passenger bench seat according to claim 1, wherein the seatbelt system comprises, in a third configuration of the passenger bench seat, a third number of seatbelts which are detachably fastened to the fastening rail in third positions which are adapted to the third configuration of the passenger bench seat.

3. The passenger bench seat according to claim 1, wherein the seat element has a continuous seating surface.

4. The passenger bench seat according to claim 1, wherein the backrest has a continuous backrest surface.

5. The passenger bench seat according to claim 1, wherein at least one first seatbelt-retaining element comprises a fastening section which extends around a periphery of the fastening rail, and a connecting section, which extends from the fastening section, for connecting the first seatbelt-retaining element to a second seatbelt-retaining element.

6. The passenger bench seat according to claim 5, wherein the connecting section comprises a first connecting plate, a second connecting plate which extends substantially parallel to the first connecting plate and a connecting shaft which extends, substantially perpendicularly to the first and second connecting plates, between the first and the second connecting plate.

7. The passenger bench seat according to claim 1, wherein at least one second seatbelt-retaining element comprises a connecting snap-hook with a snap-hook nose which is resiliently pretensioned into a closed position of the connecting snap-hook.

8. The passenger bench seat according to claim 1, wherein at least one second seatbelt-retaining element comprises a baseplate and also an eye, which is formed in the baseplate, for connecting the second seatbelt-retaining element to a belt element of the seatbelt.

9. The passenger bench seat according to claim 1, further comprising an armrest system which comprises, in a first configuration of the passenger bench seat, a first number of armrests which are arranged in first positions which are adapted to the first configuration of the passenger bench seat, and which armrest system comprises, in a second configuration of the passenger bench seat, a second number of armrests which are arranged in second positions which are adapted to the second configuration of the passenger bench seat.

10. The passenger bench seat according to claim 9, wherein the armrest system comprises, in a third configuration of the passenger bench seat, a third number of armrests which are arranged in third positions which are adapted to the third configuration of the passenger bench seat.

11. The passenger bench seat according to claim 9,
wherein the armrest system comprises at least one recess, which is constructed in the backrest of the passenger bench seat, for receiving an armrest, the recess being dimensioned such that it is capable of receiving the armrest so completely that a surface of the armrest which faces towards the seating surface of the seat element when the armrest is in a usable condition, is aligned flush with the backrest surface of the backrest when the armrest is in a condition in which it is received in the recess.

12. The passenger bench seat according to claim 1,
wherein the backrest is equipped with a stiffening structure in the region of an edge that faces away from the seat element.

13. An aircraft comprising a plurality of passenger bench seats according to claim 1 in direction of a longitudinal axis of the aircraft.

\* \* \* \* \*